F. Peale,

Check Valve.

No. 682. Reissued Apr. 5, 1859.

Witnesses
M. Baird
J. H. Shaw

Inventor:
Franklin Peale

UNITED STATES PATENT OFFICE.

FRANKLIN PEALE, OF PHILADELPHIA, PENNSYLVANIA.

IMPROVED TUBULAR ELASTIC VALVE.

Specification forming part of Letters Patent No. 15,192, dated June 24, 1856; Reissue No. 682, dated April 5, 1859.

*To all whom it may concern:*

Be it known that I, FRANKLIN PEALE, of the consolidated city and county of Philadelphia, in the State of Pennsylvania, have invented new and improved flexible valves for syringes, pumps, and all other instruments to which such valves may be adapted, whether such instruments be of rigid or flexible materials, including gum-elastic and its combinations, of which the following is a specification.

The construction of these valves and their operation are intended to imitate as nearly as may be the valves of the arterial and other portions of the human organization, being the simplest and best adapted to the objects in view. They may be constructed of the same materials as the tubes or pipes in which they are placed, either in the original fabrication or in parts by adhesive cements of the same base or component parts, as may be found most convenient or practicable; or they may be attached in any way desired to rigid tubes of any description in which they can be employed.

Figure 1:
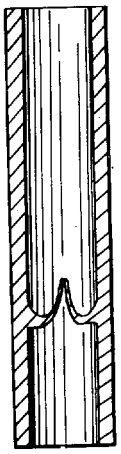

Figure 1, letter *a* of the drawing represents a longitudinal section of what may be called the "vein-valve," and letter *b* a cross-section of the same. The first exhibits a side view of the valve closed, and is intended to be made by a duplication of the flexible material, reduced in thickness so as to yield readily to the upward passage of fluids operated upon, and to close as readily and prevent their passage downward or in a reversed direction. Or, in other words, the drawing represents a pocket, double, one on each side of the walls of the passage, whose thin, flexible edges lie together, but permitting the passage of fluids in one direction and arresting the flow in the other. Letter *b* of the same figure exhibits the position of the valve as if closed and seen from above.

Figure 2:
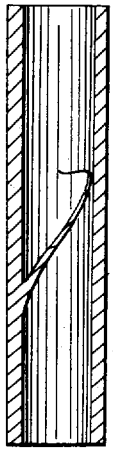

Fig. 2, letter *a* represents a longitudinal section of a single arterial valve with one flexible pocket constructed of the same materials as the walls of the tube in its original construction, or cemented in, and, like the preceding, is a duplication of the flexible material, opening freely to the passage of fluids in one direction and closing as freely in the opposite. Letter *b* of Fig. 2 is a representation of the valve closed by a cross-section, seen from above.

Figure 3:
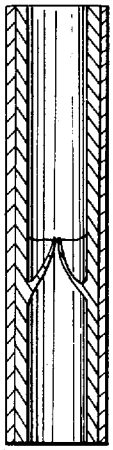

Fig. 3 represents a triplicate or threefold construction of the same general form and operating in the same manner as the preceding, letter *b* of that figure representing the manner in which the thin, flexible edges lie in contact and operate in permitting or arresting the flow, according to its direction.

Figure 4:
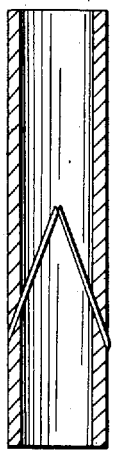
Figure 4:
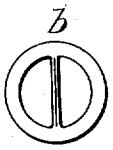
Figure 4:
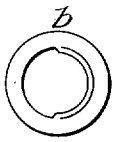
Figure 4:
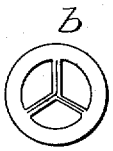
Figure 4:
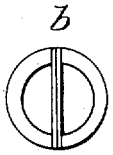
Figure 4:
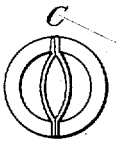

Fig. 4 represents what may be called a "splice-valve," constructed upon the same general principles by dividing the walls of the tube in a sloping direction to the middle from each side and inserting plates of the flexible or elastic material and cementing them to the walls of the tube, leaving their upper edges in contact, but at liberty to expand when requisite for the flow of fluids in one direction, and arresting it in the opposite direction. The horizontal sections *b* and *c* of the same figure exhibit the appearance of the valves from above, the first closed, the last open.

The valves in each of the above cases can either be constructed of the lining material or interior of the tube, or they can be constructed of any flexible material and inserted in the tube, the feature of my improvement being the employment of valves composed of flexible materials arranged so as to open in one direction by the elastic or flexible quality of the material composing the valve, and to close again by reason of the same property. Heretofore in pumps, syringes, and other instruments constructed of flexible materials, it has been customary to make valves of metal and insert them in the course of the flexible tube; but this is attended with some expense, and such valves are liable to become deranged readily and to lose their shape by any pressure brought upon the outside of the tube or valve-seat. My improved valves, being made of a duplicature of the flexible lining or interior of the tube, or of similar material inserted therein, are not liable to derangement. They yield to pressure and immediately resume their proper form and position. They act equally well, no matter in what position they may be placed. They can be manufactured at a very trifling cost compared to metallic valves, and they are very effective.

Having thus described my improved valves, what I claim as my invention, and desire to secure by Letters Patent, is—

1. The flexible valves herein described, for the purposes specified.

2. The method herein described of adapting the said flexible valves to pump or other tubes of any kind, whether rigid or elastic, and inserting them therein in the manner set forth and shown, or in any equivalent mode.

FRANKLIN PEALE.

Witnesses:

ALEX. G. GAW,

BENJ. DAVIS.